United States Patent
Whitehead

[19]

[11] Patent Number: 5,901,266
[45] Date of Patent: May 4, 1999

[54] UNIFORM LIGHT EXTRACTION FROM LIGHT GUIDE, INDEPENDENTLY OF LIGHT GUIDE LENGTH

[75] Inventor: Lorne A. Whitehead, Vancouver, Canada

[73] Assignee: The University of British Columbia, Vancouver, Canada

[21] Appl. No.: 08/923,335

[22] Filed: Sep. 4, 1997

[51] Int. Cl.[6] .................................................. G02B 6/00
[52] U.S. Cl. ........................................ 385/133; 385/132
[58] Field of Search .................................. 385/133, 131, 385/130, 132, 901

[56] References Cited

U.S. PATENT DOCUMENTS

| | | | |
|---|---|---|---|
| 4,615,579 | 10/1986 | Whitehead | 385/133 |
| 4,750,798 | 6/1988 | Whitehead | 385/133 |
| 4,787,708 | 11/1988 | Whitehead | 385/133 |
| 4,850,665 | 7/1989 | Whitehead | 385/133 |
| 4,937,716 | 6/1990 | Whitehead | 362/31 X |
| 5,186,530 | 2/1993 | Whitehead | 362/31 |
| 5,243,506 | 9/1993 | Whitehead | 362/307 |
| 5,481,637 | 1/1996 | Whitehead | 385/125 |
| 5,661,839 | 8/1997 | Whitehead | 385/131 |

FOREIGN PATENT DOCUMENTS

| | | |
|---|---|---|
| 292173 A2 | 11/1988 | European Pat. Off. . |
| 2664411 | 1/1992 | France . |
| 3600635 A1 | 7/1987 | Germany . |
| WO 95/16877 | 6/1995 | WIPO . |

*Primary Examiner*—Phan T. H. Palmer
*Attorney, Agent, or Firm*—Oyen Wiggs Green & Mutala

[57] ABSTRACT

A light guide light extraction mechanism can be formed in a predetermined maximum length to yield a predetermined light emission characteristic. Any shorter length segment removed from a predetermined end of the extraction mechanism and installed in a light guide of that shorter length causes the shorter length light guide to exhibit substantially uniform surface brightness. This obviates the need for cumbersome trial and error development of a different light extraction mechanism for each such shorter light guide.

17 Claims, 4 Drawing Sheets

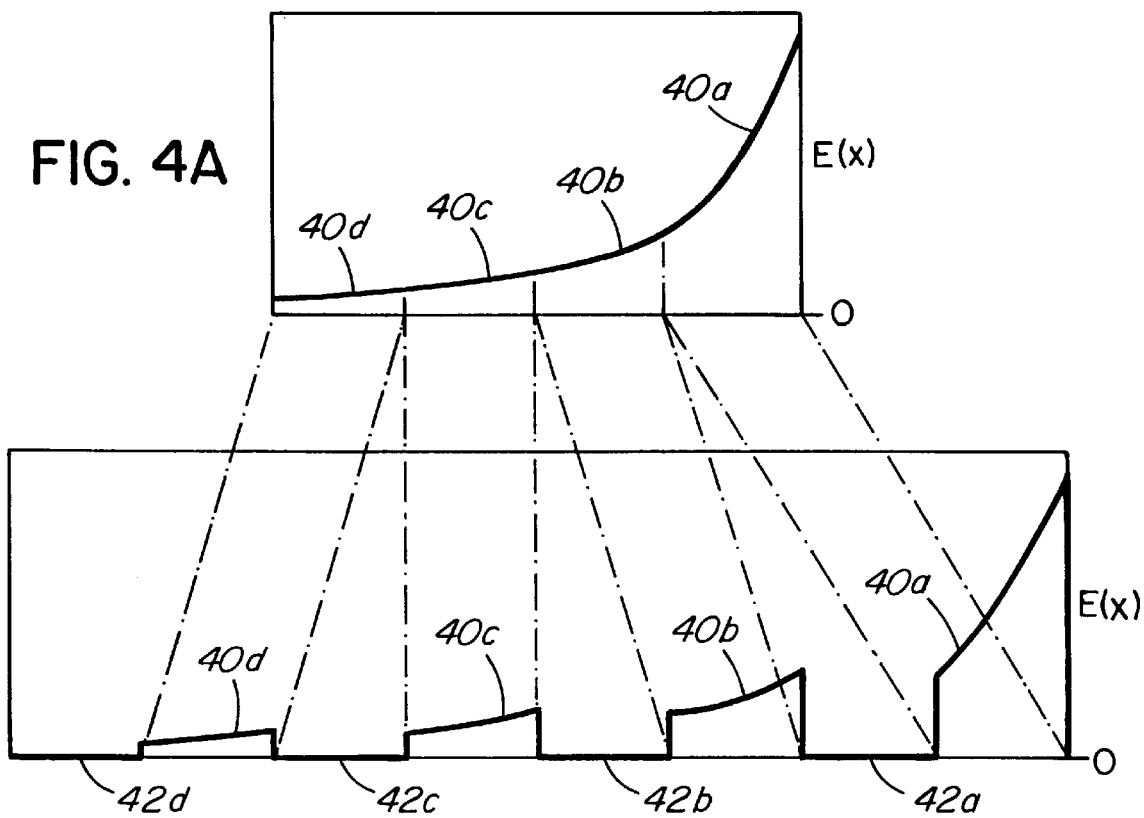
FIG. 4A
FIG. 4B
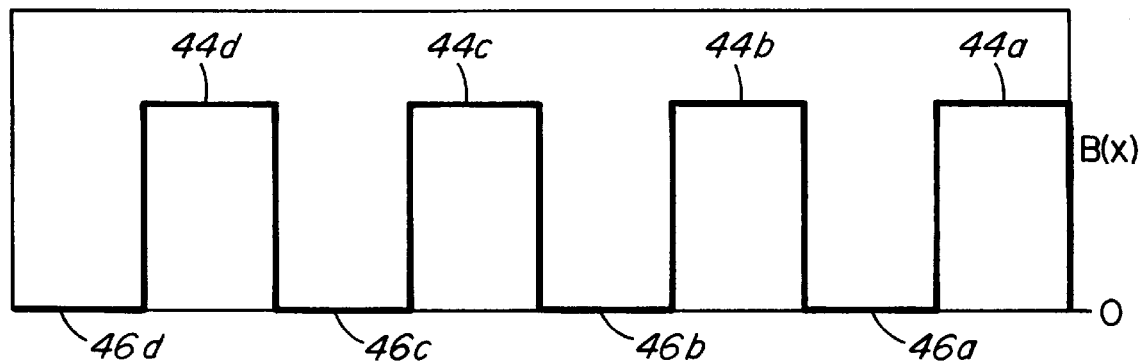
FIG. 4C

UNIFORM LIGHT EXTRACTION FROM LIGHT GUIDE, INDEPENDENTLY OF LIGHT GUIDE LENGTH

TECHNICAL FIELD

This application pertains to a method of extracting light from a light guide such that the light is extracted with a desired degree of uniformity over the light guide's light emitting surface and such that light guides of different lengths having the same light extraction mechanism exhibit the same degree of uniformity.

BACKGROUND conventionally, a cumbersome trial and error process must be used to design a light guide such that the light guide's light emitting surface will be uniformly illuminated. Typically for example a light guide having desired dimensions is constructed and operated to determine the uniformity with which light is emitted at different points on the emitting surface. The light guide's light extraction mechanism, which may take various forms, as noted, for example, in U.S. Pat. No. 4,787,708 Whitehead "Apparatus For Continuously Controlled Emission of Light From Prism Light Guide", is then altered in a manner which is expected to improve the light guide's uniformity of illumination. The foregoing steps are repeated until an acceptable degree of uniformity is attained.

The foregoing prior art technique results in a light extraction mechanism which can be reused only in light guides having the same dimensions as the light guide for which the extraction mechanism was developed. If the same extraction mechanism is used in a new light guide having substantially different dimensions then it is a very likely that the new light guide will not emit light with the same degree of uniformity as the light guide for which the extraction mechanism was developed.

It is most typical to vary the length dimension of a light guide to suit different applications, and considerably less typical to vary the light guide's other dimensions. The present invention facilitates construction of a light extraction mechanism for a "standard" light guide of predetermined maximum length having a desired uniform light output characteristic. Shorter light guides, each having the same uniform light output characteristic as the standard light guide (but having different brightness characteristics, due to the inverse relationship of light guide length and brightness), can be constructed by removing from the appropriate end of a light extraction mechanism identical to that required for the standard light guide, a segment equal to the desired length of the shorter light guide. This obviates the need for cumbersome trial and error development of a different light extraction mechanism for each such shorter light guide. The invention also facilitates construction of a modular light guide having a length which can be a multiple of a standardized unit length, such that the light guide's light output uniformity remains constant, irrespective of the length of the light guide.

SUMMARY OF INVENTION

The invention facilitates construction of a light guide light extraction mechanism having a predetermined light emission characteristic and a predetermined maximum length. Any shorter length segment removed from a predetermined end of the maximum length extraction mechanism and installed in a light guide of that shorter length causes the shorter length light guide to exhibit substantially uniform surface brightness.

The invention also facilitates construction of a light guide formed of a contiguous plurality of light guide modules. Each module has a light extraction mechanism having a particular light emission characteristic, such that the module's light emitting surface has a desired uniform surface brightness. The light emitting surfaces of any number of the modules selected from one end of the light guide together exhibit the same uniformity of surface brightness.

The invention further provides a method of making a light guide of any desired length less than a predetermined maximum length. A light extraction mechanism of the predetermined maximum length is initially provided, such that the extraction mechanism's light emission characteristic as a function of length produces uniform surface brightness when that mechanism is installed in a light guide having the same maximum length. A light guide having any desired length less than the maximum length can then be constructed by removing, from a predetermined end of a duplicate of the maximum length extraction mechanism, a segment having a length equal to the desired light guide length and incorporating that segment in the light guide.

In another method, a maximum light guide length is selected and divided into sublengths. A plurality of light guide segments having light emitting surfaces are formed. Each segment has a length equal to one of the aforementioned sublengths. A light extraction mechanism is provided for each light guide segment. Each extraction mechanism is designed to have a light emission characteristic which varies as a function of the length of the corresponding light guide segment. Accordingly, the brightness of the emitted light can be maintained constant over any selected number of light guide segments which are contiguously adjoined to form one end of the light guide.

In another method, a maximum light guide length is selected. A light extraction mechanism is then designed for a light guide having that maximum length. The extraction mechanism's light emission characteristic varies as a function of length, such that light emitted through the light guide's light emitting surface produces a uniform surface brightness at all points on the light emitting surface. The extraction mechanism is then divided into a plurality of sublengths ordered from one end of the extraction mechanism to the opposite end thereof (i.e. from the end furthest from the light guide's light input source to the end closest to the light source). A light guide segment is formed for each extraction mechanism sublength, and coupled thereto. A selected number of the light guide segments are then contiguously adjoined to form a light guide of desired length, while maintaining the order of the extraction mechanism sublengths, and including the extraction mechanism sublength which formed the end of the extraction mechanism furthest from the light source.

BRIEF DESCRIPTION OF DRAWINGS

FIG. 4A graphically depicts the emission characteristic E(x) of a light guide light extracting mechanism as a function of length. FIG. 4B graphically depicts the emission characteristic E(x) of a segmented version of the FIG. 4A light extracting mechanism. FIG. 4C graphically depicts the surface brightness B(x) of the light emitting surface of a light guide having the FIG. 4B light extracting mechanism.

DESCRIPTION

Figure 1A:
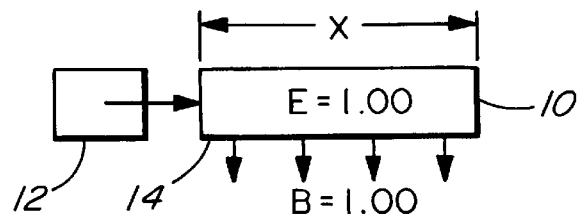
FIGS. 1A, 1B and 1C are simplified schematic illustrations of idealized modular light guides which are respectively one, two and three units in length.

FIG. 1A depicts an idealized light guide module 10 of unit length x. Light source 12 emits collimated light into module 10 in conventional fashion. The input light is distributed along module 10 and is uniformly emitted through light emitting surface 14 by virtue of the design of module 10's light extraction mechanism. Module 10 is defined as having an "emission characteristic" E=1.00, meaning that all of the input light is emitted over the length of emitting surface 14 to yield a surface brightness B=1.00. This is an unrealizable simplification, of course, because inevitably there will be some internal losses. However, such losses do not materially affect the present analysis.

Figure 1B:
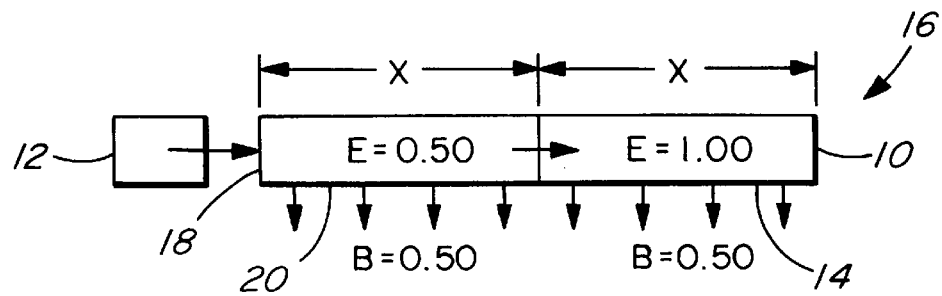

Now consider FIG. 1B, which depicts an idealized light guide 16 of length 2x made up of two unit length modules 18, 10. The light extraction mechanism of module 18 is configured to yield an emission characteristic E=0.50, meaning that one-half of the light input into module 18 by light source 12 is uniformly emitted through module 18's light emitting surface 20, which thus has a surface brightness B=0.50. The remaining one-half of the light input into module 18 is transmitted by module 18 into module 10, which is identical to module 10 of FIG. 1A. If all of the light input into light guide 16 is to be emitted through emitting surfaces 20, 14 then module 10 must emit one-half of the total light input into module 18 by light source 12. Since this is precisely the amount of light transmitted from module 18 into module 10, it follows that module 10 must emit all of its input light. In other words, in the FIG. 1B embodiment, module 10 must have an emission characteristic E=1.00, just as it had in the FIG. 1A embodiment.

Figure 1C:
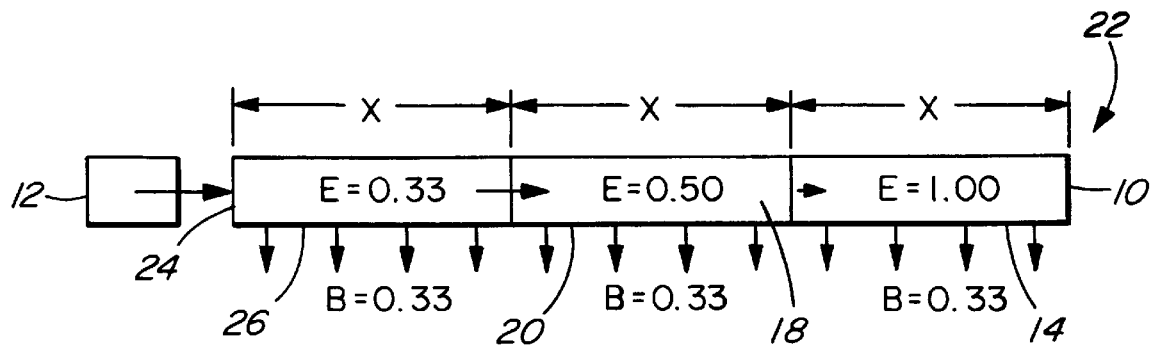

FIG. 1C depicts an idealized light guide 22 of length 3x made up of three unit length modules 24, 18, 10. The objective is again to achieve uniform light output over the modules' emitting surfaces 26, 20, 14. Each of modules 24, 18, 10 should therefore emit one third of the total light input into module 24 by light source 12. The light extraction mechanism of module 24 is accordingly configured to yield an emission characteristic E=0.33, meaning that one third of the light input into module 24 by light source 12 is uniformly emitted through module 24's light emitting surface 26, yielding a surface brightness B=0.33. The remaining two thirds of the light input into module 24 is transmitted by module 24 into module 18, which is identical to module 18 of FIG. 1B. As previously noted, module 18's emission characteristic E=0.50, so the surface brightness B of module 18's light emitting surface 20 is 0.667*0.50=0.33, as required to achieve the desired uniform-light output. As was also noted previously, module 18 transmits one half of its input light into module 10, which is again identical to module 10 of FIG. 1A. Since module 18 receives as input two thirds of the light initially input into module 24, it follows that module 18 transmits to module 10 one third of the light initially input into module 24. If all of the light input into light guide 22 is to be emitted through emitting surfaces 26, 20, 14 then module 10 must emit one third of the total light input into module 24 by light source 12. Since this is the very amount transmitted by module 18 into module 10, it again follows that module 10 must emit all of its input light. Thus, in the FIG. 1C embodiment, module 10 must have an emission characteristic E=1.00, just as it had in the FIGS. 1A and 1B embodiments.

The foregoing examples can be generalized in terms of a light guide formed of a contiguous plurality of modules $n_1$, $n_2, n_3, \ldots n_i$; with $n_1$ being the module farthest from the light source; $n_2$ being the module next farthest from the light source; and, in general, $n_i$ being the $i^{th}$ module in terms of farness of that module from the light source. Each module has an emission characteristic E=1/i. For example, in a light guide formed of a series of 10 modules, the modules' respective emission characteristics would be 1/10, 1/9, 1/8, 1/7, 1/6, 1/5, 1/4, 1/3, 1/2, 1 with the module having emission characteristic 1/10 being located closest to the light source and the module having emission characteristic 1 being located farthest from the light source.

The significance of the foregoing is that one need only design (by applying known prior art techniques) a light extraction mechanism for each one of a discrete number of modules sufficient to form the longest anticipated light guide. A range of shorter light guides, each having uniform light output characteristics, can then be formed simply by removing one or more modules from the end of the light guide closest to the light source. This is highly advantageous because it minimizes the number of different types of modules required (the design of each module's light extraction mechanism will be unique), which facilitates more efficient high volume manufacturing.

Although the foregoing description is helpful to convey the basic concept of the invention, it is overly simplistic for three reasons. First, the light guide's emission characteristic E must be a continuous function of length, so the foregoing description must be generalized to a continuous calculation. Second, side emitting light guides are generally terminated with an end mirror, or with a symmetrically opposite light guide and light source (optically equivalent to an end mirror), meaning that a light component travelling back towards the light source must be taken into account. Third, the emission characteristic E(x) of a particular light extraction mechanism is a function of the angular distribution of light in the light guide. This distribution depends on the input light conditions, and changes as light travels along the guide. For a given light source and light guide cross section geometry, all of these factors can be largely taken into account by using a more sophisticated design procedure, as described below.

The procedure begins by assuming that an emission characteristic E(0) characterizes the rate of extraction of light at the end of the light guide farthest from the light source. E(0) can be controlled, for example, by varying the density or width of the light extraction mechanism, or by varying any other parameter which is conveniently be controlled as a function of length. Generally, it is desirable that E(0) be as high as possible at the end of the light guide farthest from the light source, provided that E(0) can easily be controlled and provided that the light extraction mechanism is easily made.

Figure 2A:
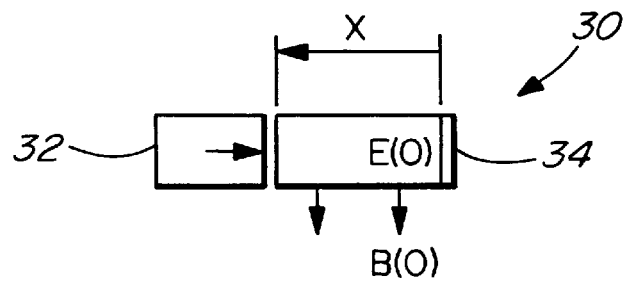
FIG. 2A is a simplified schematic illustration of a light guide module of length x, depicting idealized, uniform extraction of light therefrom at a brightness level B(0).

FIG. 2A depicts a very short length x of such a light guide 30, having a collimated light source 32, an end mirror 34 and an emission characteristic E(0). Light guide 30 is sufficiently long that it exhibits a well defined surface brightness B(0). Because light guide 30 is very short, most of the input light reflects off end mirror 34 and returns to light source 32. This is not a problem, since it would be impractical to use a light guide having such a short length. FIG. 2A simply aids in conceptualization of the design of a light extraction mechanism. It is also important to note that, for the purposes of this idealized discussion, it is assumed that light source 32 does not reflect back into light guide 30 a substantial portion of any such returning light.

Figure 2B:
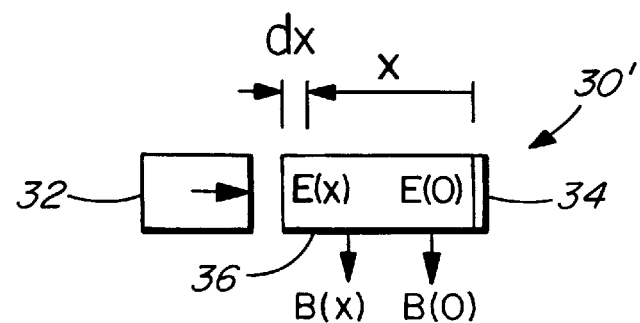
FIG. 2B shows the FIG. 2A light guide module with an incremental extension of length dx from which light is extracted at a brightness level B(x).

Now consider FIG. 2B, in which the length of the FIG. 2A light guide has been extended by adding a small segment of length dx at the end of the light guide closest to light source 32 to form a new guide 30'. If the added segment is constructed with the same emission characteristic as light guide 30 of FIG. 2A, then the added segment will be brighter than the remainder of light guide 30'. This is because the amount of light which passes through the added segment and which is thus available for extraction from the remainder of light guide 30', is reduced as a function of length by the process of extracting light from the added segment itself. Thus, to maintain uniform illumination over the entire light emitting surface 36 of light guide 30', the added segment must have a lower emission characteristic E(x) than the remainder of light guide 30', where x is distance from the end of the light guide farthest from the light source.

Figure 3A:
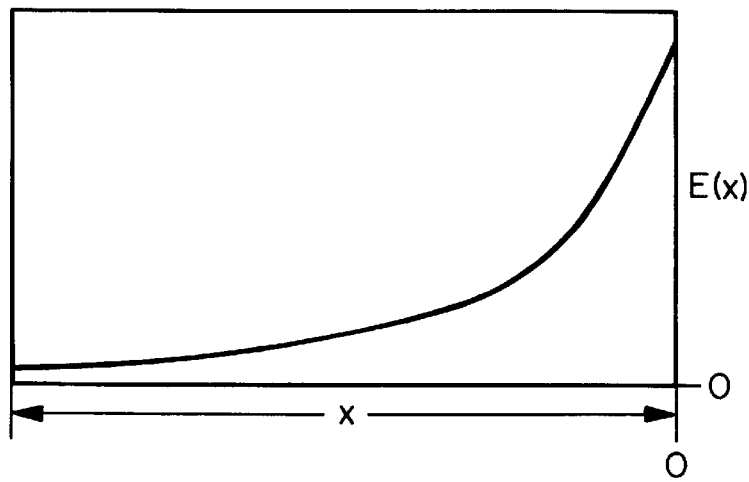
FIGS. 3A, 3B and 3C respectively graphically depict the emission characteristic E(x) of various light guide light extracting mechanisms as a function of length.
Figure 3B:
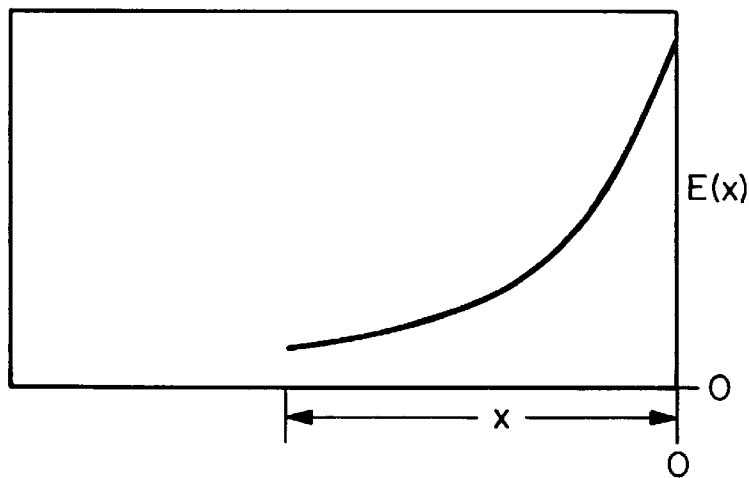
Figure 3C:
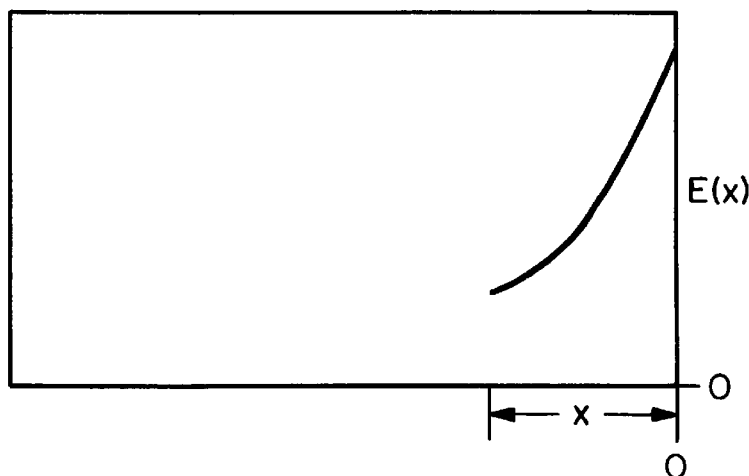

By continuously extrapolating the foregoing technique, one may design consecutively longer light guides, each having uniform light emission over the light guide's entire light emitting surface. Of course, the brightness of the light which can be extracted from the light guide reduces in inverse proportion to the light guide's length, as one would expect by conservation of energy. Further, there is a practical lower limit to the emission characteristic of any light guide which limits the length over which uniform emission can be achieved. The key point however is that the design of a light extraction mechanism for a light guide of any desired length will be identical to the design of an equivalent length portion of light extraction mechanism taken from the end of the longest possible light guide. For example, FIG. 3A graphically depicts the emission characteristic E(x), as a function of length, of the light extraction mechanism for a long light guide; FIG. 3B depicts the emission characteristic E(x) of a light extraction mechanism for a somewhat shorter light guide; and, FIG. 3C depicts the emission characteristic E(x) of a light extraction mechanism for a still shorter light guide. It can be seen that the emission characteristic of the extraction mechanism depicted in FIG. 3C is identical to the emission characteristics of the equivalent length portions of the extraction mechanisms depicted in FIGS. 3A and 3B; and, that the emission characteristic of the extraction mechanism depicted in FIG. 3B is identical to the emission characteristic of the equivalent length portion of the extraction mechanism depicted in FIGS. 3A.

A further use of such a generalized light extraction mechanism is to easily and cost-effectively achieve uniform light extraction in selected regions of a light guide, and very low extraction in the remaining regions of the guide. This can be achieved as illustrated in FIGS. 4A, 4B and 4C. Specifically, FIG. 4A shows an emission characteristic E(x) for a light guide light extracting mechanism. The FIG. 4A characteristic has four notional segments 40a, 40b, 40c and 40d. FIG. 4B depicts the emission characteristic of a light guide light extracting mechanism in which segments 40a, 40b, 40c and 40d are interleaved with non-light emitting light guide segments 42a, 42b, 42c and 42d. The extracting mechanism which produces the FIG. 4B characteristic is easily obtained by dividing the extracting mechanism which produced the FIG. 4A characteristic into four separate pieces corresponding to segments 40a, 40b, 40c and 40d, separating the pieces and inserting non-light emitting light guide segments between them. FIG. 4C graphically depicts the surface brightness B(x) of the light emitting surface of a light guide having the FIG. 4B light extracting mechanism, where x is again distance from the end of the light guide farthest from the light source. As indicated by 44a, 44b, 44c and 44d the light guide emits light with uniform brightness in the regions which respectively contain the extraction mechanism pieces corresponding to segments 40a, 40b, 40c and 40d; and, emits no light in the regions 46a, 46b, 46c and 46d which respectively contain non-light emitting light guide segments 42a, 42b, 42c and 42d. Each of segments 40a, 40b, 40c and 40d; and, segments 42a, 42b, 42c and 42d may be of any desired length.

Figure 5:
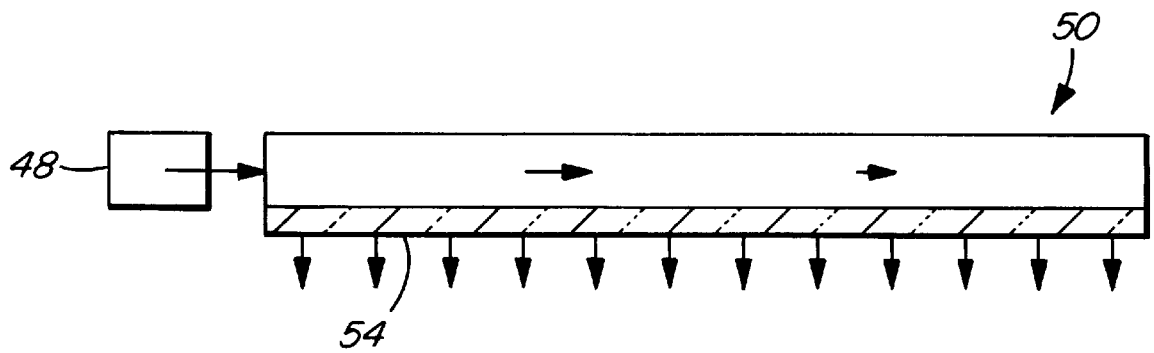
FIG. 5 depicts a light guide to which a micro-structured film light extractor mechanism is optically bonded.

As shown in FIG. 5, the invention may be implemented by providing a light extraction mechanism 54 of predetermined maximum length in the form of a microstructured film which can be optically bonded to a light guide 50 having maximum length and having a light source 48. The characteristics of the microstructure vary as a function of length in the manner required to give light guide 50 the desired light emission characteristic and uniform surface brightness. Although the initial design and creation of extraction mechanism 54 may be cumbersome and relatively expensive, it will thereafter be relatively simple and inexpensive to replicate extractor mechanism 54. This is most significant and beneficial, in that any light guide shorter than light guide 50 and having the same uniform light output characteristic as light guide 50 can easily be constructed by replicating extractor mechanism 54, and removing from the end thereof farthest from light source 48 (as viewed in FIG. 5), a segment equal in length to the desired length of the shorter light guide.

In the prior art, the aforementioned trial and error process would have to have been repeated to create a different extractor mechanism, each time a light guide of a different (shorter) length was to be constructed. The invention eliminates such repetition. One may maintain an inventory of identical extractor mechanisms of predetermined maximum length as aforesaid and thereafter custom fabricate light guides of any desired (shorter) length by removing from one of the inventoried extractor mechanisms a segment of the required length. The remaining portion of that inventoried extractor mechanism is "wasted", in the sense that such remaining portion will not itself be of practical value in constructing a light guide. That however is a minor factor in comparison to the very significant manufacturing simplification afforded by the invention.

As will be apparent to those skilled in the art in the light of the foregoing disclosure, many alterations and modifications are possible in the practice of this invention without departing from the spirit or scope thereof. For example, the invention can be applied, without restriction, to prism light guides, optical fibre light guides, planar dielectric light guides, or to any light guide in which an extraction mechanism is used to extract light from the guide. Accordingly, the scope of the invention is to be construed in accordance with the substance defined by the following claims.

What is claimed is:

1. A light guide light extraction mechanism, said extraction mechanism having a predetermined maximum length and a predetermined light emission characteristic, whereby any shorter length segment of said extraction mechanism removed from a predetermined end of said maximum length extraction mechanism and installed in a light guide of said shorter length causes said shorter length light guide to exhibit substantially uniform surface brightness.

2. A light guide light extraction mechanism as defined in claim 1, wherein said light emission characteristic varies as a function of length of said extraction mechanism.

3. A light guide light extraction mechanism as defined in claim 1, wherein said light emission characteristic varies continuously as a function of length of said extraction mechanism.

4. A light guide light extraction mechanism as defined in claim 1, wherein said extraction mechanism further comprises a microstructured film, said microstructure having at least one characteristic which varies continuously as a function of length of said extraction mechanism.

5. A light guide comprising a contiguous plurality of light guide modules, each of said modules further comprising a light extraction mechanism having a light emission characteristic and a light emitting surface, wherein said light emitting surfaces of any number of said modules selected from one end of said light guide together exhibit a substantially uniform surface brightness.

6. A light guide as defined in claim 5, further comprising a non-light emitting light guide segment between any selected adjacent pair of said modules.

7. A light guide as defined in claim 6, wherein each of said non-light emitting light guide segments has a selected length.

8. A light guide as defined in claim 5, wherein said extraction mechanisms further comprise a microstructured film, said microstructure having at least one characteristic which varies continuously as a function of length of said respective mechanisms.

9. A light guide as defined in claim 5, wherein each of said light emission characteristics varies as a function of length of said respective modules.

10. A light guide as defined in claim 5, wherein each of said light emission characteristics varies continuously as a function of length of said respective modules.

11. A method of making a light guide, said method comprising the steps of:

(a) selecting a maximum length for said light guide;

(b) providing a light extraction mechanism of said maximum length, said extraction mechanism having a light emission characteristic as a function of length, said light emission characteristic for producing uniform brightness of light emitted through a light emitting surface of said light guide;

(c) providing a light guide having a desired length shorter than said maximum length;

(d) removing from a predetermined end of said light extraction mechanism a segment of said light extraction mechanism having a length equal to said desired length; and, (e) incorporating said removed extraction mechanism segment in said provided light guide.

12. A method of making a variable length light guide, said method comprising the steps of:

(a) selecting a desired maximum length for said light guide;

(b) dividing said maximum length into a plurality of sublengths;

(c) for each one of said sublengths, forming a light guide segment having a length equal to said sublength and having a light emitting surface;

(d) providing a light extraction mechanism for each one of said light guide segments, said respective extraction mechanisms each having a light emission characteristic as a function of length of said corresponding light guide segment, said light emission characteristic producing a surface brightness of light emitted through said light emitting surface of said corresponding light guide segment, and wherein said surface brightness is constant over any number of said light guide segments which are contiguously adjoined to form one end of said light guide; and, (e) contiguously adjoining a selected number of said light guide segments to form said light guide.

13. A method as defined in claim 12, further comprising inserting a non-light emitting light guide segment between any selected adjacent pair of said light emitting surface-bearing light guide segments.

14. A method as defined in claim 13, wherein each of said non-light emitting light guide segments has a selected length.

15. A method of making a variable length light guide, said method comprising the steps of:

(a) selecting a desired maximum length for said light guide;

(b) providing a light extraction mechanism of said maximum length, said extraction mechanism having a light emission characteristic as a function of said maximum length, said light emission characteristic for producing uniform brightness of light emitted through a light emitting surface of said light guide;

(c) dividing said extraction mechanism into a plurality of sublengths ordered from one end of said extraction mechanism to another end thereof;

(d) for each one of said sublengths, forming a light guide segment having a length equal to said sublength and coupling said extraction mechanism sublength to said light guide segment; and, (e) contiguously adjoining a selected number of said light guide segments to form said light guide, while maintaining said order of said extraction mechanism sublengths, and including that one of said extraction mechanism sublengths which formed said one end of said extraction mechanism.

16. A method as defined in claim 15, further comprising inserting a non-light emitting light guide segment between any selected adjacent pair of said light emitting surface-bearing light guide segments.

17. A method as defined in claim 16, wherein each of said non-light emitting light guide segments has a selected length.

* * * * *